(12) United States Patent
Nunn

(10) Patent No.: US 6,637,152 B1
(45) Date of Patent: Oct. 28, 2003

(54) APPARATUS/PROCESS FOR PRODUCING LIQUID FERTILIZER

(76) Inventor: Garry Robert Nunn, Lot 5 Mc Neil Road, Cedar Pocket, Queensland, 4570 (AU)

( * ) Notice: Subject to any disclaimer, the term of this patent is extended or adjusted under 35 U.S.C. 154(b) by 0 days.

(21) Appl. No.: 09/445,290

(22) PCT Filed: Jun. 9, 1998

(86) PCT No.: PCT/AU98/00435

§ 371 (c)(1),
(2), (4) Date: Dec. 6, 1999

(87) PCT Pub. No.: WO98/55427

PCT Pub. Date: Dec. 10, 1998

(30) Foreign Application Priority Data

Jun. 6, 1997 (AU) .............................................. PO7206

(51) Int. Cl.$^7$ .................................................. C05F 3/00
(52) U.S. Cl. .......................... 47/58.1; 241/17; 504/102; 504/116; 424/725
(58) Field of Search ............................ 47/58.1; 241/17; 504/102, 116; 424/725

(56) References Cited

U.S. PATENT DOCUMENTS

| 3,618,862 | A | * | 11/1971 | Phelps |
| 4,583,319 | A | * | 4/1986 | Wolff et al. |
| 4,829,708 | A | * | 5/1989 | Gonzalez |
| 5,641,127 | A | | 6/1997 | Masumura |

FOREIGN PATENT DOCUMENTS

JP         62-09521        3/1985

* cited by examiner

Primary Examiner—Leon B. Lankford, Jr.
(74) Attorney, Agent, or Firm—Young & Thompson

(57) ABSTRACT

An apparatus is provided for producing liquid fertilizer from manure. The apparatus includes at least one tank filled with water, a cage having a perforated pipe arranged closed to a bottom floor of the cage and a pump connected to the pipe for delivery of pressured air through the perforations of the pipe. In use, the cage is loaded with fresh manure and then submerged in the tank of water. The pressured air agitates and aerates the manure and thereby causing aerobic decomposition of the manure. Nutrients in the manure are thereby extracted from the manure and mixed with the water to form a liquid fertilizer. A fertigation arrangement can be arranged to deliver the liquid fertilizer from the tank directly to plants.

5 Claims, 6 Drawing Sheets

APPARATUS/PROCESS FOR PRODUCING LIQUID FERTILIZER

CROSS REFERENCE TO RELATED APPLICATION

This is the 35 USC 371 national stage of International Application PCT/AU98/00435, filed on Jun. 9, 1998, which designated the United States of America.

TECHNICAL FIELD OF THE INVENTION

This invention relates to an apparatus and/or a process for producing liquid fertiliser from one or more decomposable nutrient containing organic materials such as manure, and in particular but not limited the apparatus and/or process is adapted to produce the liquid fertiliser in situ in a garden or a plantation field.

1. Background of the Invention

Gardening, agricultural cultivation, horticultural cultivation and the like require a large amount of fertilisers for promoting satisfactory growth in plants or vegetation. The fertilisers are intended for supplementing nutrients which in substantial amounts are being constantly removed from soil by repeated crops of the plants or vegetation.

Chemical fertilisers and organic fertilisers presently available are costly to purchase. They must also be transported to sites for distribution to the plants or vegetation. Transportation adds further costs to the gardens and the farmers.

Where the fertilisers are in a solid form they must be applied to the soil and then watered in order to make their nutrients available to the plants or vegetation. Where the fertilisers are in a concentrated liquid form they must be diluted with water before applying to the plants or vegetation. These fertilisers are therefore time and labour intensive.

2. Object of the Invention

An object of the invention is to alleviate or to at least reduce to a certain level one or more of the above prior art disadvantages.

SUMMARY OF THE INVENTION

In one aspect the present invention resides in a process for producing liquid fertiliser, the process comprising the steps of:

(a) loading one or a mixture of decomposable nutrient containing organic materials, in a container having a plurality of vents in at least one wall thereof for nutrients of the organic material or materials to pass there through and an air outlet means positioned therein;

(b) submerging the container in a tank of water or a liquid which is predominantly water;

(c) applying pressurised air to said air outlet means for agitating and aerating the organic material or materials in order to cause aerobic decomposition and to extract a substantial amount of the nutrients therefrom; and (d) removing from the tank the container with solids for the substantially decomposed organic material or materials therein;

wherein the extracted nutrients passing through the vents and together with the water or liquid forming the liquid fertiliser.

In preference, the process of the present invention includes a further step of adding to the water or liquid one or a combination of two or more additives for keeping odour to a minimum whilst improving nutrient extraction capacity and/or causing the extracted nutrients to be more readily absorbed by the plants or vegetation. Preferably the one additive or the combination is selected from a microbial activator, a biological accelerator and an enzyme catalyst.

Desirably, the process of the present invention includes another further step of delivering the liquid fertiliser to the plants of vegetation.

In a second aspect the present invention resides in an apparatus for producing liquid fertiliser from one or a mixture of decomposable nutrient containing organic materials. The apparatus comprises a container having a plurality of vents in at least one wall thereof for nutrients of the organic material or materials to pass therethrough and an air outlet means fixed therein; a pressure generating means for causing pressurised air to flow through the air outlet means and at least one tank into which the container can be placed. In use the at least one tank is filled with water or a liquid which is predominantly water and the container loaded with the organic material or materials is submerged in the water or liquid so that the pressurised air can agitate and aerate the organic material or materials in order to cause aerobic decomposition and to extract a substantial amount of the nutrients for forming the liquid fertiliser.

The organic material or materials can be any animal and/or poultry manure.

Typically the invention includes at least one further tank filled with water or a liquid which is predominantly water into which the container can be submerged following the removing step (d) and thereafter repeating the steps (c) to (d).

Typically, the air outlet means is a perforated pipe positioned at or adjacent to the bottom of the container.

The air outlet means may have a connector to which a hose from a pump can be connected. This connector can be in the form of a commercially available "cam-lock" quick release pipe fitting.

The air outlet means may also have a removable end cap so that upon removal the air outlet means can be cleaned by pressurised air or water.

The vents in the at least one wall of the container may have a diameter ranging from 0.5 to 5 mm, but 1.5 mm is preferred.

The container is advantageously provided with a hatch door which can be opened for loading and unloading the organic material or materials. A locking arrangement may be provided for locking the hatch door in place in order to prevent solids of the organic material or materials from escaping into the liquid fertiliser.

A support frame may be positioned over the at least one tank for supporting the container while submerged in the tank.

A conveying means such as a rolling gantry can be arranged so that the container can be selectively moved between a loading station for loading the organic material or materials, at least one decomposing station for decomposing the organic material or materials to form the liquid fertiliser and an unloading station for unloading the substantially decomposed organic material or materials.

A winch arrangement is typically provided for positioning the container into and out of the at least one tank.

Desirably the container is pivotally supported so that it can be pivotally moved to an emptying position for emptying the substantially decomposed organic material or materials.

The unloaded organic material or materials are desirably subject to a composting process for use as potting medium or mulch.

Typically the plants or vegetation are fruit trees, vines or vegetables.

BRIEF DESCRIPTION OF THE DRAWINGS

In order that the present invention can be readily understood and put into practical effect the description will hereinafter refer to the accompanying drawings which illustrate non limiting embodiments of the present invention and wherein.

DETAILED DESCRIPTION OF THE DRAWINGS

Figure 1:
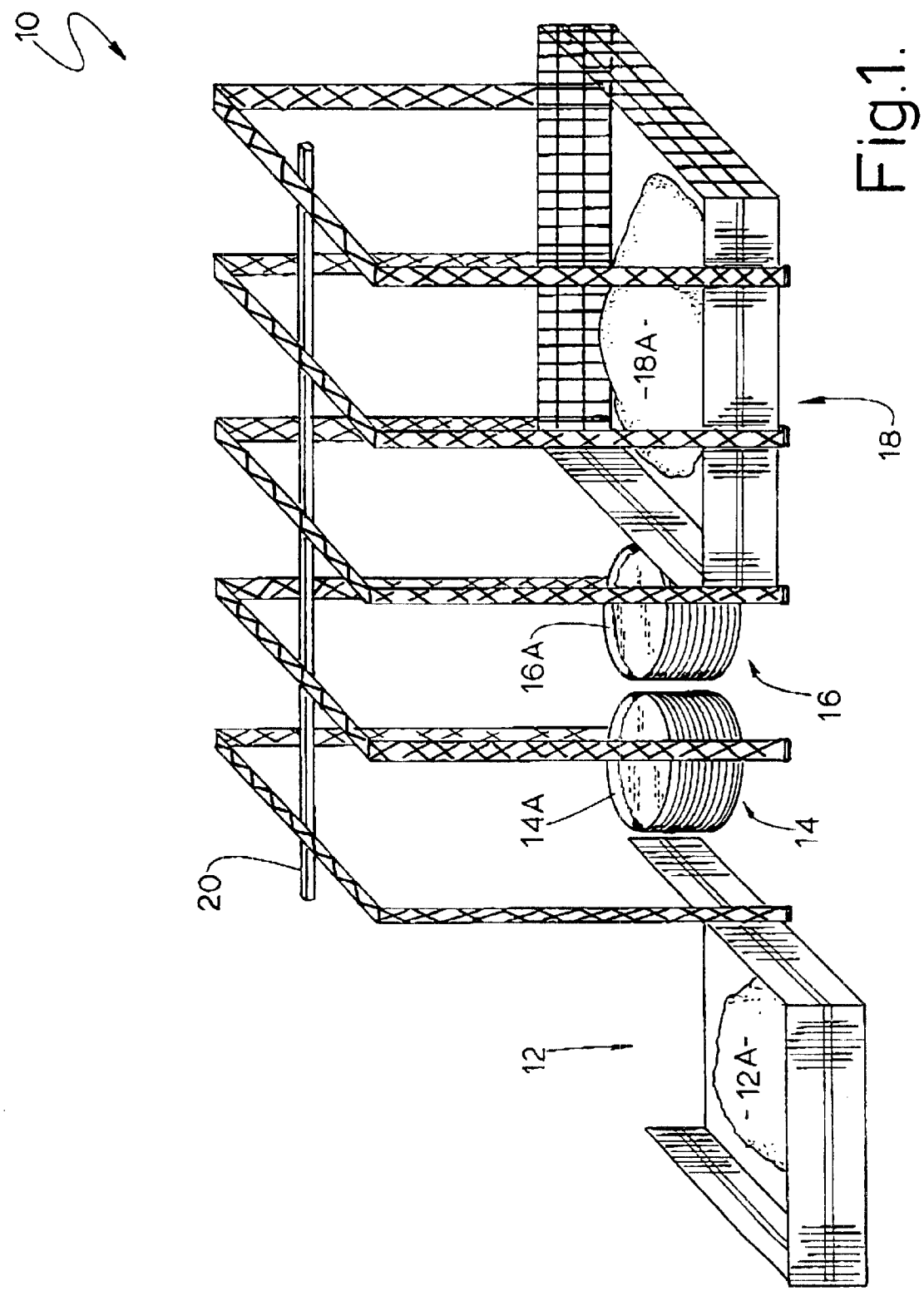
FIG. 1 is a perspective view of parts of the processing stations for the apparatus of the present invention.

Referring initially to FIG. 1 there is shown a superstructure of an apparatus 10 for producing liquid fertiliser according to one embodiment of the present invention. The apparatus 10 has a loading station 12, first manure decomposing station 14, second manure decomposing station 16, an unloading station 18 and a container conveying arrangement 20 in the form of a rolling gantry.

As can be seen the rolling gantry 20 extends to all the stations 12 to 18 so that a container 22 (see FIGS. 2 and 3) which is movably connected to the gantry 20 can be selectively positioned over any of the stations 12 to 18.

Positioned in the loading station 12 is a bunker 12A into which fresh manure for producing a liquid fertiliser is deposited. To load the manure the container 22 is moved along the gantry 20 to a position over the bunker 12A and a winch arrangement (to be described later) is employed to lower the container 22 to a suitable height for loading the manure into the container 22.

Figure 2:
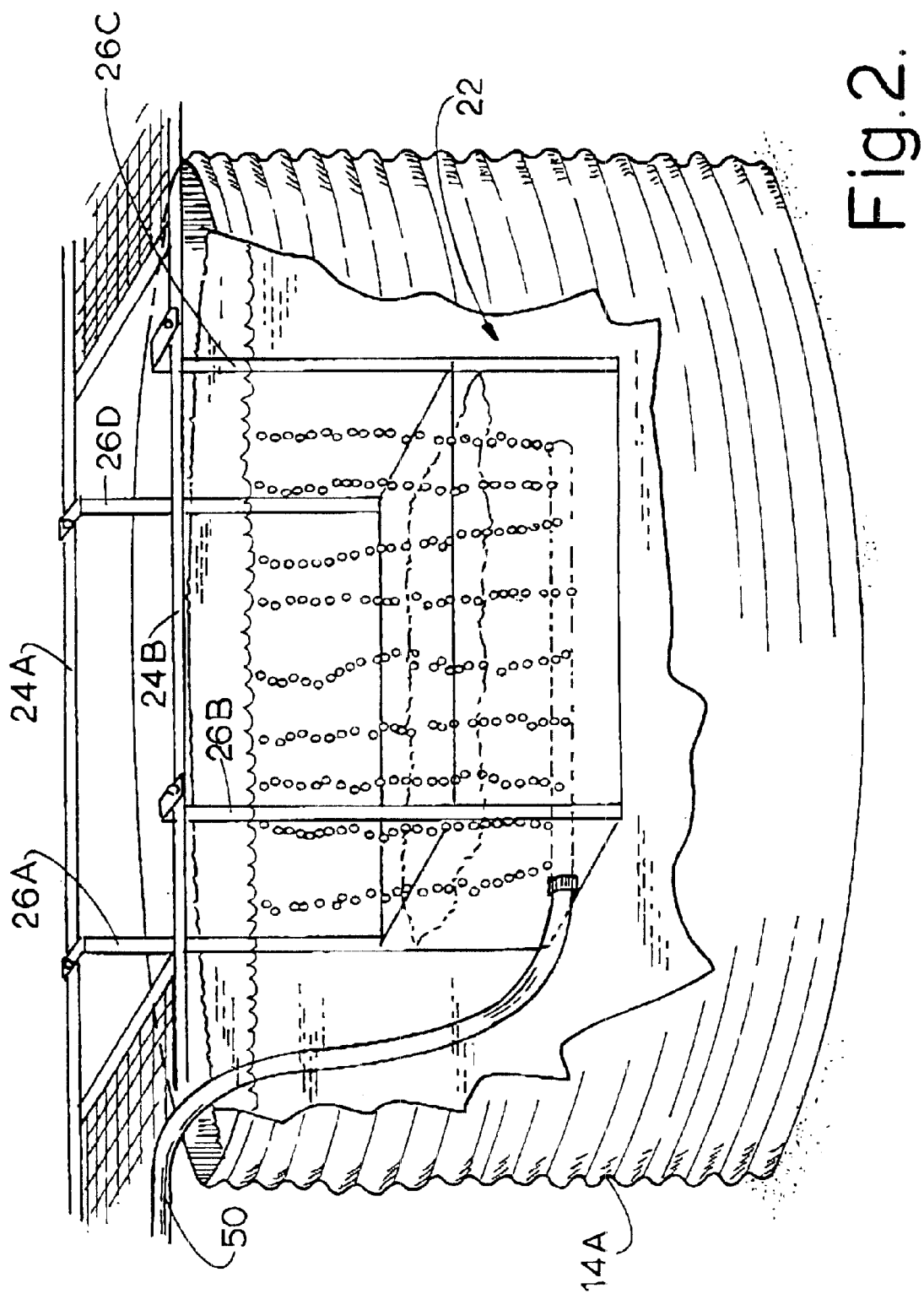
FIG. 2 shows a partial cross-section view of a decomposing station of the apparatus shown in FIG. 1.
Figure 3:
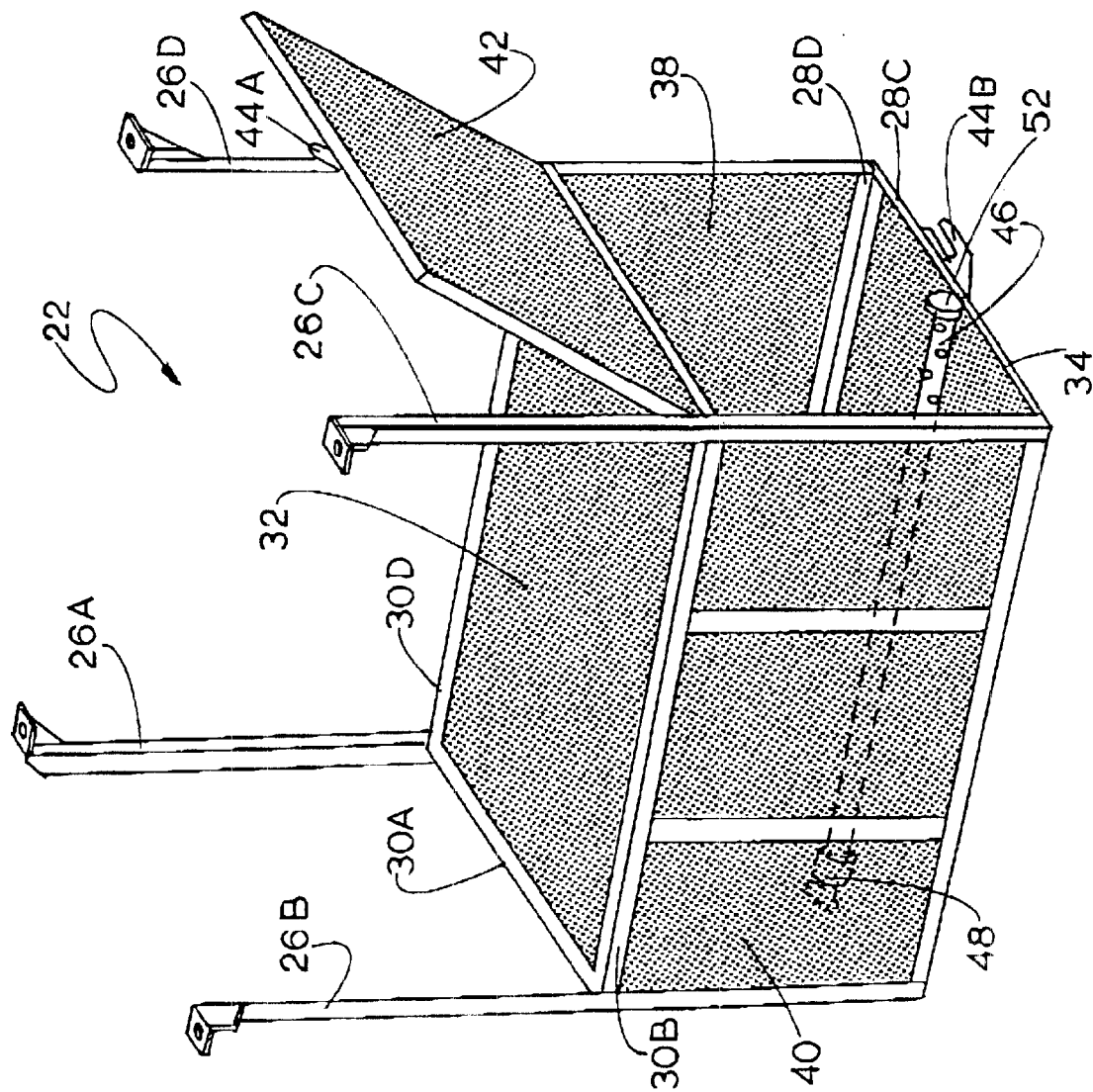
FIG. 3 shows a perspective view of the container for the apparatus shown in FIG. 1.

When the container 22 has a sufficient load of the manure it is winched up and moved to a position over the station 14 at which the winch is operated to submerge the container 22 into a tank 14A which has been filled with water to a predetermined depth of about 600 mm over the top wall of the container 22 when it is fixed to bars 24A and 24B of a support frame 24 (see FIG. 2).

Turning to FIG. 2 the container 22 as shown is submerged in water in the tank 14A. The container 22 is substantially box shaped and has four extended L-shaped vertical corner frame members 26A to 26D which in this case are angle steel bars about 1400 mm long. Lower horizontal frame members 28A to 28D (28B to 28D only are visible) are fixed to the lower ends of the corner frame members 26A to 26D, and horizontal upper frame members 30A to 30D are also fixed to the corner frame members 26A to 26D at about 600 mm from the lower ends. The container 22 also has a top panel wall 32, a bottom panel wall 34, two opposed side panel walls 36, 38, an end wall panel 40 and a hatch door 42 arranged opposite to the end wall panel 40. Complimentary locking components 44A, 44B are arranged for locking the hatch door 42.

The panel walls 32 to 40 and the hatch door 42 have vent openings sized at about 1.5 mm diameter.

In this embodiment the side walls 36, 38, the top wall 32 and the bottom wall 34 are about 600 mm by 1200 mm in dimension. The end wall 40 and the hatch door 42 are about 600 mm by 600 mm in dimension.

The short arms of the L-shaped corner frame members 26A to 26D are fixed to the bars 24A and 24B when the manure in the container 22 is about to be subjected to agitation and aeration.

The container 22 has an air outlet pipe 46 of about 38 mm diameter positioned on the bottom wall panel 34. The pipe 46 has a plurality of through apertures in its wall for air to be delivered to the manure. One end of the pipe 46 is fixed with a "cam-lock" quick release fitting 48 for connection to a hose 50 having a complimentary "cam-lock" fitting (not shown)for connection to the fitting 48. The opposite end of the pipe 46 is fixed with an end plug 52 which can be removed for cleaning the pipe 46.

Although not shown it should be understood that a fertigation arrangement can be provided for delivering the liquid fertiliser in the tank 14A to the plants or vegetation with or without the assistance of a pump.

Figure 4:
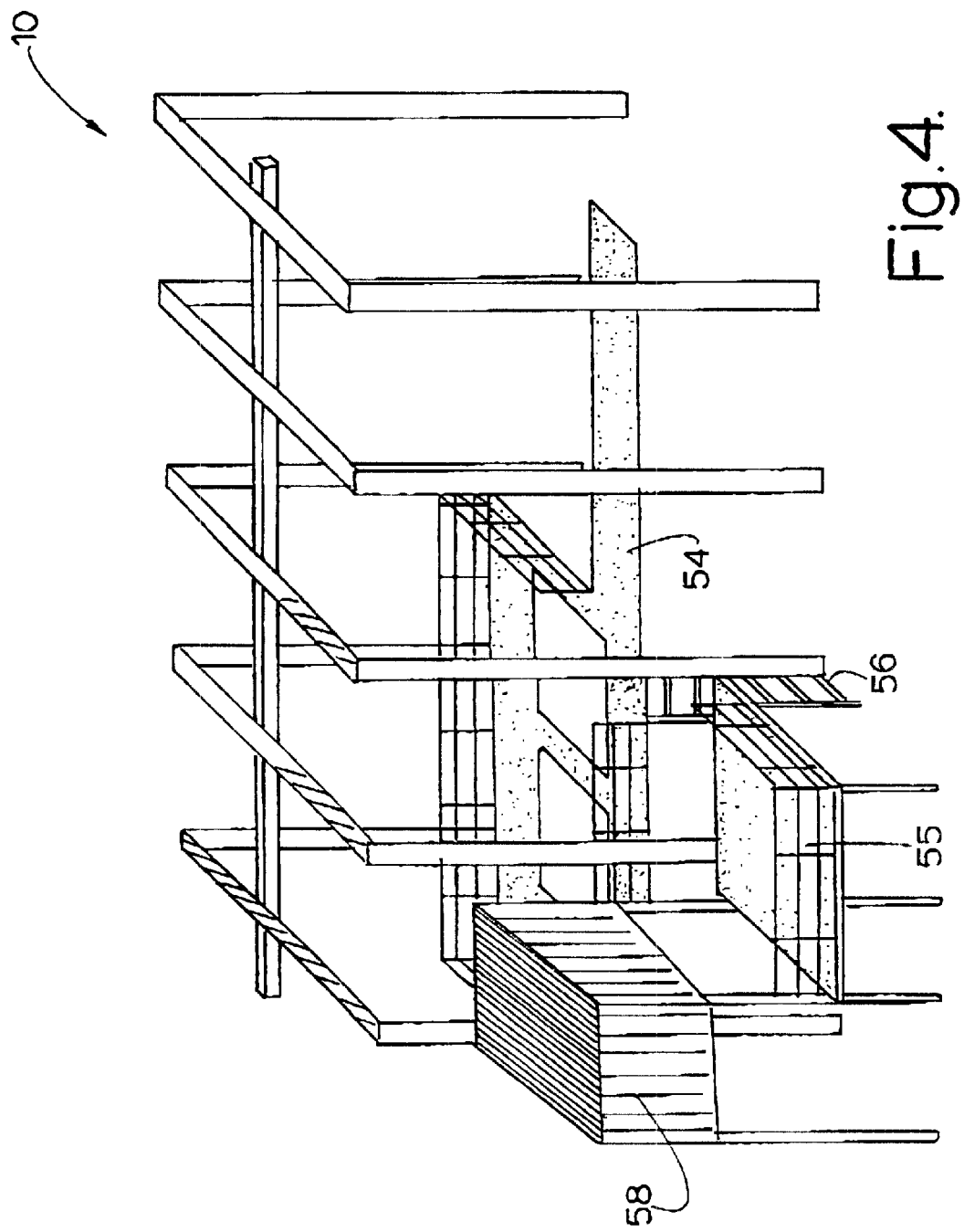
FIG. 4 shows a perspective view of parts of the processing stations for another embodiment of the apparatus of the present invention.

In FIG. 4 the apparatus 10 is substantially the same as that shown in FIG. 1 except for the raised platforms 54 and 55 which allow an operator to operate the apparatus 10 on the platforms. Steps 56 are provided for easy access to the platforms 54 and 55.

The hose 50 is connected to an air pump (not shown) for supplying pressurised air to the pipe 52 for agitating and aerating the manure. The air pump is housed in a pump housing 58.

Figure 5:
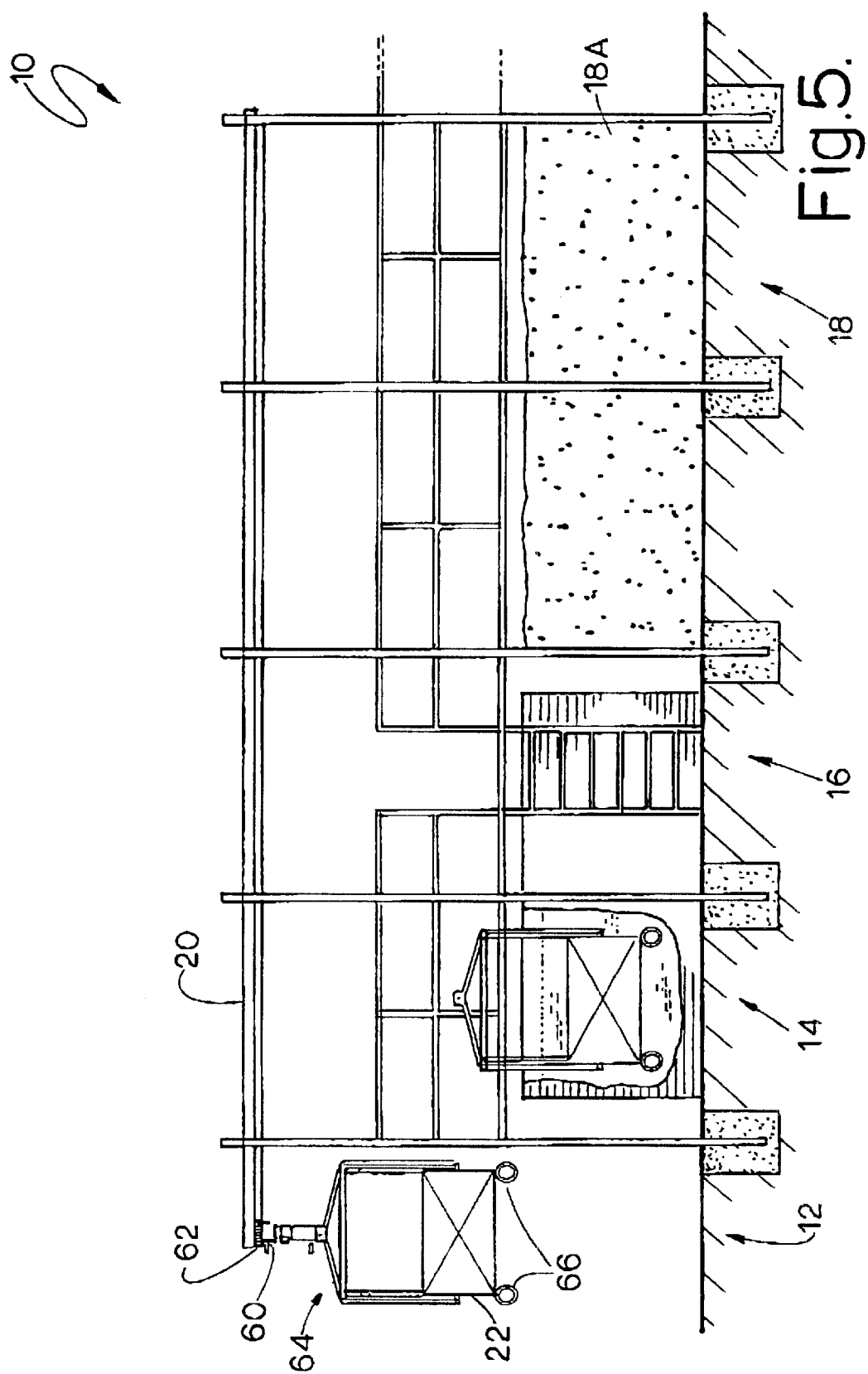
FIG. 5 shows an elevation view of parts of the processing stations for the apparatus of a further embodiment of the present invention.
Figure 6:
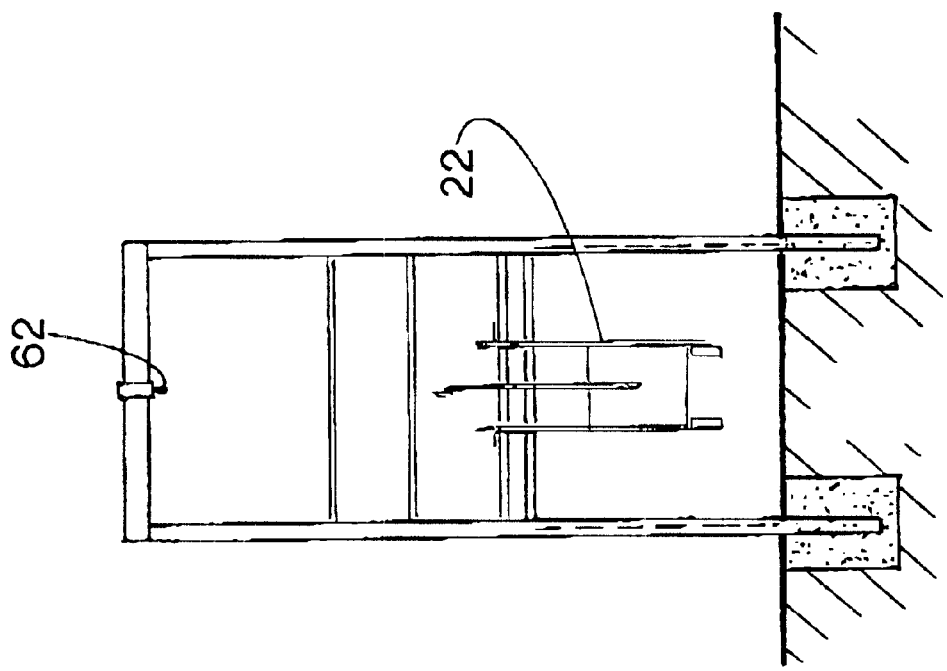
FIG. 6 shows a container in the upright position.
Figure 7:
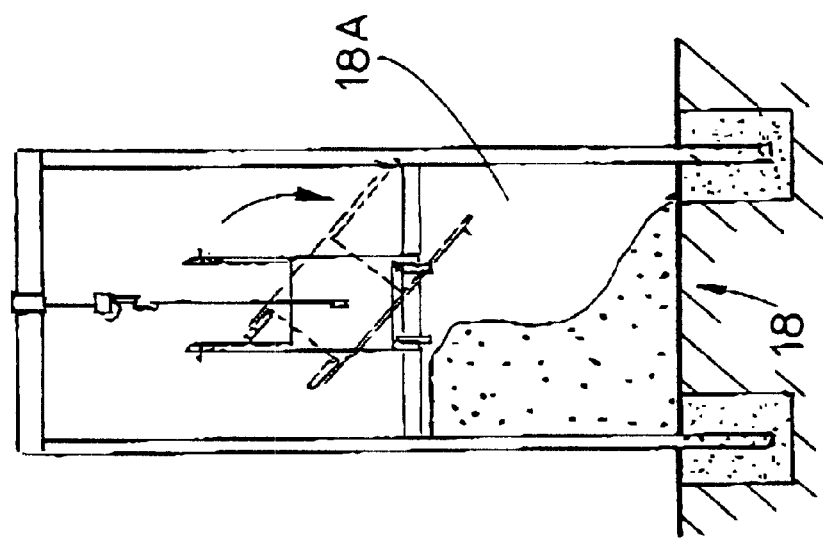
FIG. 7 shows the container of FIG. 6 in an emptying position.

In the embodiment of the apparatus 10 as shown in FIGS. 5 and 6 a mechanical winch 60 is movably connected to the rolling gantry 20 by a roller assembly 62. The winch 60 controls a cable (not shown in detail) for lifting and lowering the container 22. The container 22 is pivotally connected to arms of a substantially U-shaped frame 64 and is maintained in a vertical position by means of locking pins (not shown) in a known manner. Wheels 66 are fitted to the container 22 so that it can be wheeled around on ground.

To unload the solids remaining in the container 22 into a bunker 18A at the unloading station 18 the locking pins are removed for allowing the container 22 to rotate about the pivot axis for emptying the solids into the bunker 18A.

In use the tanks 14A and 14B are filled with water and additives for enhancing breakdown or decomposing of nutrients in the manure are added to the water. The additives keep odour to a minimum and react with the manure to improve nutrient extraction capacity and to cause nutrients to be more readily absorbed by the plants or vegetation.

Suitable additives include microbes sold under the trade name "Synbex SC-27" by Envirotec, a compost activator sold under the name "Humilac", and bacterias sold under the names of "Bacteria mix AB" and "Booster mix" by Ecocare.

The container 22 loaded with fresh manure at station 12 is then moved over the tank 14A at the station 14 where it is winched down to be submerged in the water in the tank 14A.

The air pump (not shown) is then started to generate pressurised air for agitating and aerating the manure through the perforations in the pipe 46 thereby causing aerobic decomposition of the manure, If desired oxygen can be added to the pressurised air.

After about four hours of agitation and aeration a substantially amount of nutrients is extracted from the manure.

The container 22 is then moved to be submerged in the tank 16A at the station 16 to be subject to further agitation and aeration for extracting more nutrients from the manure.

The liquid fertiliser thus formed in the tank 14A can now be applied directly to the plants or vegetation.

When substantially all of the nutrients have been extracted from the manure the container 22 holding the remaining solids of the manure is moved to the station 18 where the remaining solids are emptied into the bunker 18A for composting.

In one form of composting the solid remains of the manure are covered with a plastic tarpaulin material for about four to six weeks. The temperature under the tarpaulin can reach up to 85 degrees Celsius whereby sterising most weeds which may be present in the remaining solids and causing composting to occur.

The composted solid remains are useful as potting medium or mulch.

Whilst the above has been given by way of illustrative example of the present invention many variations and modifications thereto will be apparent to those skilled in the art without departing from the broad ambit and scope of the invention as herein set forth.

What is claimed is:

1. A process for producing liquid fertilizer, which comprises the following steps:

(a) loading one or a mixture of decomposable nutrient-containing organic materials in a container having a plurality of vents in at least one wall thereof for nutrients of the organic material or materials to pass therethrough, and an air supply means positioned therein;

(b) submerging the container in a tank of water or water-containing liquid;

(c) applying pressurized air to said air supply means for agitating and aerating the organic material or materials in order to cause aerobic decomposition of the organic material or materials, and to extract a substantial amount of nutrients therefrom; and (d) removing the container holding solids of substantially decomposed organic material or materials therein from the tank;

wherein the extracted nutrients pass through the vents and mix together with the water or liquid to form the liquid fertilizer.

2. The process according to claim 1, further comprising adding to the water or liquid one or a combination of two or more additives for keeping odor to a minimum while improving nutrient extraction capacity and causing the extracted nutrients to be more readily absorbed by plants or vegetation.

3. The process according to claim 2, wherein the one additive or the combination of additives is selected from the group consisting of a microbial activator, a biological accelerator and an enzyme catalyst.

4. The process according to claim 1, further comprising a step of delivering the liquid fertilizer to plants or vegetation.

5. The process according to claim 1, further comprising providing at least one further tank filled with water or a water-containing liquid into which the container can be submerged following the removing step (d); and thereafter repeating the steps (c) to (d).

* * * * *